(12) United States Patent
D'Aluisio

(10) Patent No.: US 8,197,371 B2
(45) Date of Patent: Jun. 12, 2012

(54) COGSET ASSEMBLY FOR A BICYCLE

(75) Inventor: Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 651 days.

(21) Appl. No.: 12/019,495

(22) Filed: Jan. 24, 2008

(65) Prior Publication Data

US 2009/0191996 A1    Jul. 30, 2009

(51) Int. Cl.
*F16H 55/30* (2006.01)
(52) U.S. Cl. ............... 474/160; 301/110.5; 474/156
(58) Field of Classification Search ............ 301/124.2, 301/110.5; 192/64; 474/152, 153, 154, 156, 474/157, 158, 160, 161
See application file for complete search history.

(56) References Cited

U.S. PATENT DOCUMENTS

| | | | |
|---|---|---|---|
| 3,513,725 A | 5/1970 | Shimano et al. | |
| 3,648,519 A * | 3/1972 | Nakata et al. | 474/80 |
| 3,661,021 A * | 5/1972 | Ohshita | 474/80 |
| 3,772,932 A * | 11/1973 | Nagano | 474/160 |
| 3,900,088 A | 8/1975 | Ozaki | |
| 4,047,603 A | 9/1977 | Ozaki | |
| 4,102,215 A | 7/1978 | Nagano et al. | |
| 4,230,212 A | 10/1980 | Tsuchie et al. | |
| 4,324,323 A * | 4/1982 | Campagnolo | 192/64 |
| 5,020,648 A | 6/1991 | Bush et al. | |
| 5,125,489 A * | 6/1992 | Cha | 192/64 |
| 5,324,100 A * | 6/1994 | James | 301/110.5 |
| 5,378,201 A | 1/1995 | Lee et al. | |
| 5,460,254 A | 10/1995 | Huang | |
| 5,590,894 A | 1/1997 | Wen | |
| 5,632,364 A | 5/1997 | Mercat | |
| 5,738,197 A | 4/1998 | Kröger et al. | |
| 5,816,377 A * | 10/1998 | Nakamura | 192/64 |
| 5,957,802 A | 9/1999 | Yoo | |
| 6,142,904 A | 11/2000 | Yoo | |
| 6,176,798 B1 | 1/2001 | Nakamura | |
| 6,264,575 B1 * | 7/2001 | Lim et al. | 474/77 |
| 6,478,128 B2 | 11/2002 | Taylor | |
| 6,488,603 B2 * | 12/2002 | Lim et al. | 474/160 |
| 6,557,684 B1 | 5/2003 | Jäger et al. | |
| 6,591,956 B1 | 7/2003 | Neugent | |
| 6,827,497 B2 | 12/2004 | Chen | |
| 2006/0211533 A1 | 9/2006 | Yoo | |
| 2007/0089960 A1 | 4/2007 | Kanehisa | |

FOREIGN PATENT DOCUMENTS

JP     59197629     4/1993

* cited by examiner

*Primary Examiner* — Michael Mansen
*Assistant Examiner* — Juan Campos, Jr.
(74) *Attorney, Agent, or Firm* — Knobbe, Martens, Olson & Bear, LLP

(57) ABSTRACT

A bicycle hub assembly comprises a shaft, a first load bearing adjacent said shaft, a hub main body surrounding said shaft, and a cogset. The cogset can define an inner surface, and the inner surface can define a seat configured to receive the first load bearing. Further, the inner surface can define an opening of variable size. The cogset can also define an inner end and an outer end, and the opening can generally increase in size from the outer end to the inner end.

11 Claims, 13 Drawing Sheets

COGSET ASSEMBLY FOR A BICYCLE

BACKGROUND OF THE INVENTION

1. Field of the Invention

The inventions described herein generally relate to apparatuses for driving bicycles.

2. Description of the Related Art

The related art includes bicycle drives such as gears and sprockets, connected by chain to pedals or some other power source.

SUMMARY OF THE INVENTION

In accordance with some embodiments of a cogset assembly for a bicycle, a bicycle hub assembly comprises a shaft, a first load bearing adjacent said shaft, a hub main body surrounding said shaft, and a cogset. The cogset can define an inner surface, and the inner surface can define a seat configured to receive the first load bearing. Further, the inner surface can define an opening of variable size. The cogset can also define an inner end and an outer end, and the opening can generally increase in size from the outer end to the inner end.

In some embodiments the cogset can further define two mounting portions. The first mounting portion can define a smaller open cross-section than the second mounting portion, and can cooperate to rotatably mount the cogset on a shaft. The second mounting portion can cooperate to mount the cogset on a hub assembly.

Further, in some embodiments the shaft can define an outer surface that can define a smaller diameter portion. The smaller diameter portion can be adjacent an outer end of the cogset. A larger diameter portion can be adjacent an inner end of the cogset. The shaft can also define a smaller diameter portion positioned opposite the outer end of the cogset. The shaft can be substantially composed of carbon fiber, aluminum, steel, similar materials, or mixes thereof. The shaft can also have a diameter greater than 15 mm.

Further, some embodiments can comprise a ratchet mounted on the hub main body. Similarly, in some embodiments a ratchet portion can be mounted on the cogset, corresponding to the ratchet mounted on the hub. In other embodiments, a ratchet assembly can be mounted on the cogset.

In some embodiments, a bicycle hub assembly can comprise a hub main body. The hub main body can be surrounded by a bushing. A cogset can be rotatably supported by the bushing. The cogset can further define an inner surface, and the inner surface can define an opening of variable size. Further, the opening can generally increase in size from an outer end to an inner end, each defined by the inner surface of the cogset. The hub assembly can further comprise a ratchet mounted on the hub main body, and a ratchet portion mounted on the cogset. In other embodiments, the hub assembly can comprise a ratchet assembly mounted on the cogset.

In some embodiments, a bicycle hub assembly can comprise a hub main body defining an axis. The bicycle hub assembly can further comprise a cogset surrounding a portion of the hub main body. Further, the cogset can extend axially from the hub main body and be rotatable with respect thereto. The cogset can further define an inner surface, said inner surface defining an opening of variable size. Further, the opening can generally increase in size from an outer end to an inner end, each defined by the inner surface of the cogset. The hub assembly can also comprise a ratchet mounted on the hub main body. The hub assembly can further comprise a ratchet portion mounted on the cogset. In other embodiments, the hub assembly can comprise a ratchet assembly mounted on the cogset.

In some embodiments, a bicycle hub assembly can comprise a bicycle shaft, a first load bearing adjacent the shaft, a hub main body surrounding the bicycle shaft, and a cogset. The cogset can be positioned substantially directly against the first load bearing. Similarly, the cogset can be positioned within a half (½) millimeter of the load bearing.

In some embodiments, a cogset can comprise an inner surface comprising a plurality of ratchet teeth. The cogset can further comprise a plurality of cogs and a portion for receiving a bearing assembly along the inner surface. The inner surface can have variable size along the axis of the cogset. Further, the inner surface can generally increase in size monotonically from one end of the cogset to another. The cogset can further include at least one cog with cog size less than 11. The cogset can also comprise an outer surface, said outer surface comprising cogs substantially formed from at least two distinct materials. At least one of said materials can be titanium.

In some embodiments a cogset can comprise a plurality of cogs and an inner surface comprising a spline portion. The inner surface can comprise variable size along the axis of the cogset and a portion for receiving a bearing assembly. The inner surface can generally increase in size monotonically from one end of the cogset to another. The cogset can further include at least one cog with cog size less than 11 teeth. The cogset can also comprise an outer surface comprising cogs substantially formed from at least two distinct materials. At least one of said materials can be titanium.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION OF THE PREFERRED EMBODIMENT

A number of objectives are presented in the context of bicycle design. It is generally desirable to provide a bicycle that is simultaneously light, reliable, capable of both high and low gear ratios, and comprising minimal friction or loss, as well as other objectives. Material strength is often proportional to material size and weight, and thus lightness and reliability often present conflicting objectives.

The disclosure herein describes a cogset assembly for a bicycle. The disclosure herein additionally describes a hub assembly for a rear bicycle wheel. The disclosure herein additionally describes combinations of cogset and hub assemblies.

Figure 1:
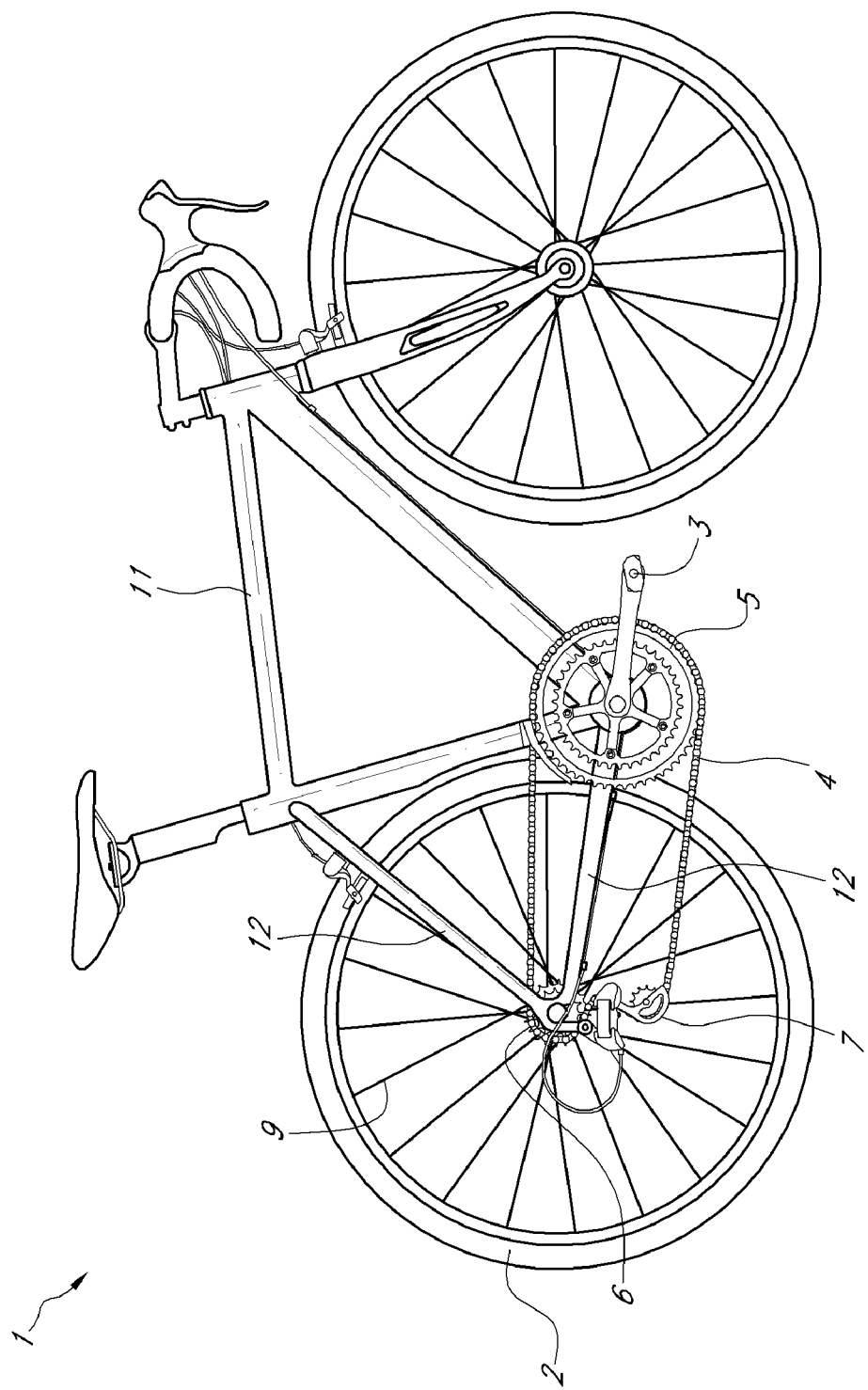
FIG. 1 depicts a bicycle with one embodiment of a cogset and hub assembly.

FIG. 1 depicts a bicycle 1 with a cogset and hub assembly 6. The bicycle 1 can comprise a frame 11, pedals 3, pedal sprocket 5, chain 4, cogset and hub assembly 6, and rear wheel 2. The frame 11 can comprise stays 12 that can connect a rear wheel 2 to the main portion of the bicycle frame 11. The rear wheel 2 can be driven by pedals 3 via a chain 4. The links of the chain 4 can be configured to interact with the pedal sprocket 5, which causes the chain 4 to rotate upon the rotation of the pedals 3. The chain 4 can further interact with a cogset and hub assembly 6 to cause the cogset and hub assembly 6 to rotate, thus also rotating the rear wheel 2 as discussed below. The rear wheel 2 may further comprise a derailleur 7 capable of moving the chain 4 between a plurality of sprockets. Additionally, the rear wheel 2 may comprise a plurality of spokes 9 for improving the structural integrity and strength of the rear wheel.

Figure 2A:
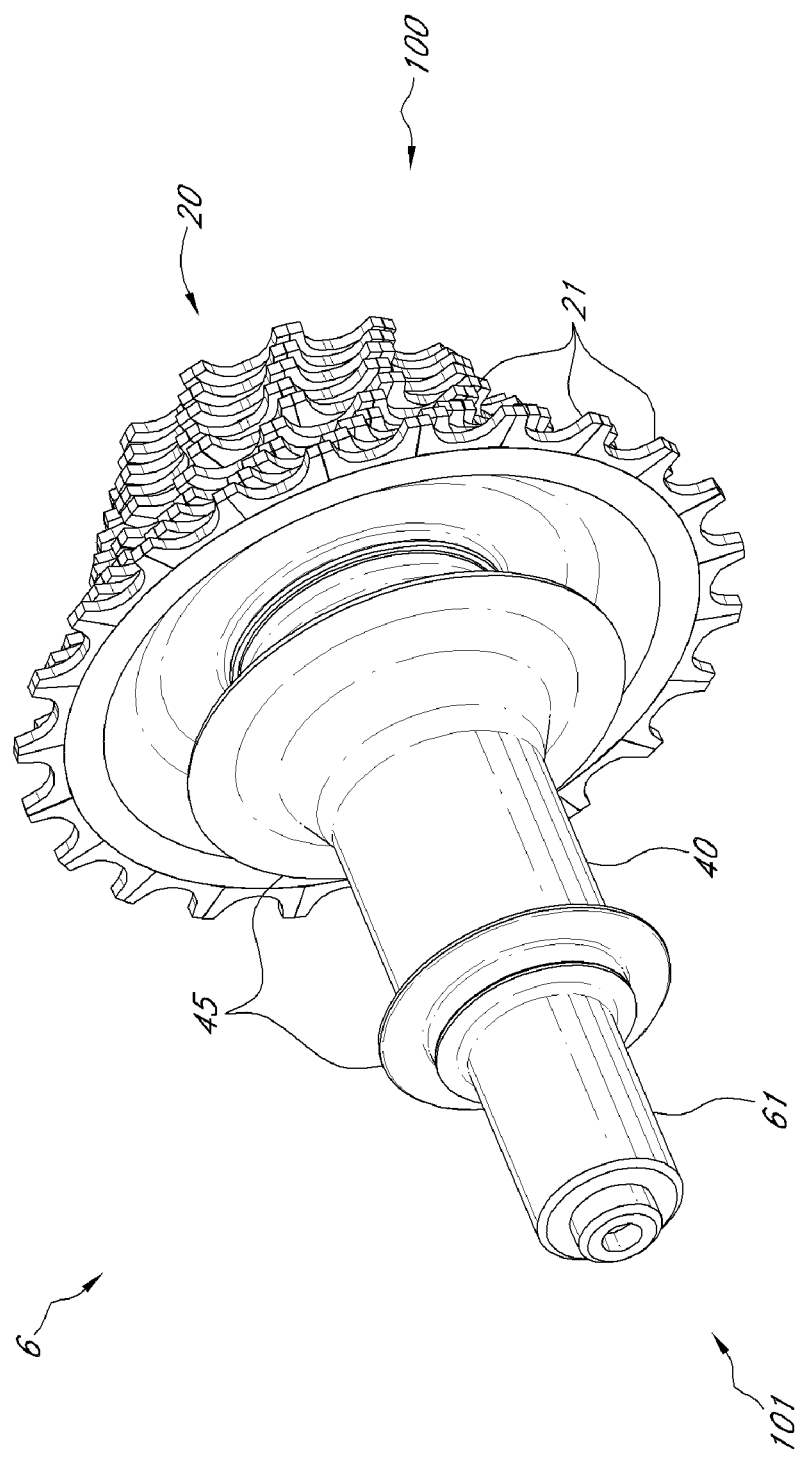
FIG. 2A depicts a perspective view of a cogset and hub assembly.
Figure 3A:
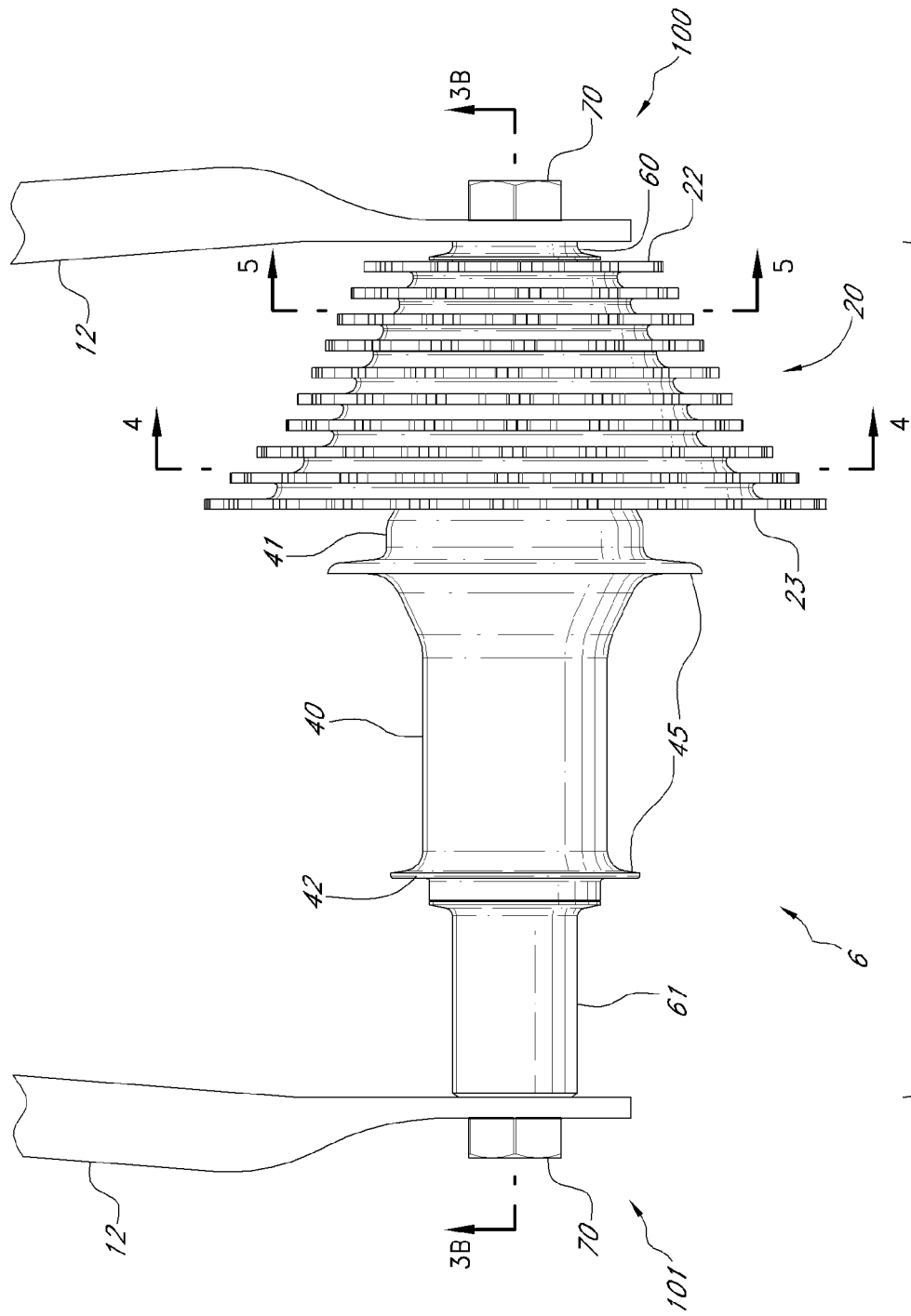
FIG. 3A depicts a side view of the cogset and hub assembly mounted on a bicycle.

FIGS. 2A, 3A depict a perspective view and a side view of one embodiment of the cogset and hub assembly 6. The cogset and hub assembly 6 may comprise a shaft 36, a hub main body 40, and a cogset 20. The cogset 20 may comprise a plurality of cogs 21 shaped to engage the chain 4. Through the cogs 21, the rotation of the chain 4 can cause the rotation of the cogset 20. The rotation of the cogset 20, through means discussed below, can in turn cause the rotation of the hub 40. The rotation of the hub 40, through the flanges 45 and spokes 9, can cause the rotation of the rear wheel 2. End caps 60, 61 can further rotate with the cogset 20 and hub 40. In other embodiments the end caps 60, 61 can rotate independently of the cogset 20 and/or hub 40, or they can remain stationary.

Figure 2B:
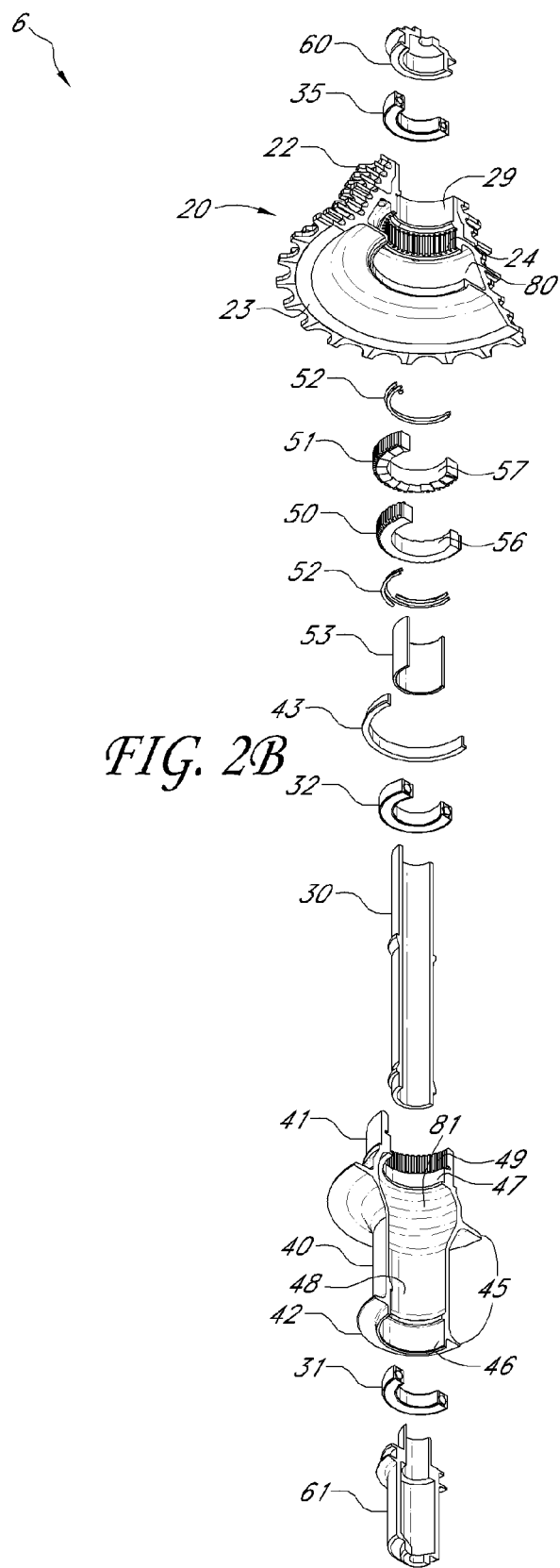
FIG. 2B depicts an exploded view of the cross-sectioned cogset and hub assembly of FIG. 2A.
Figure 3B:
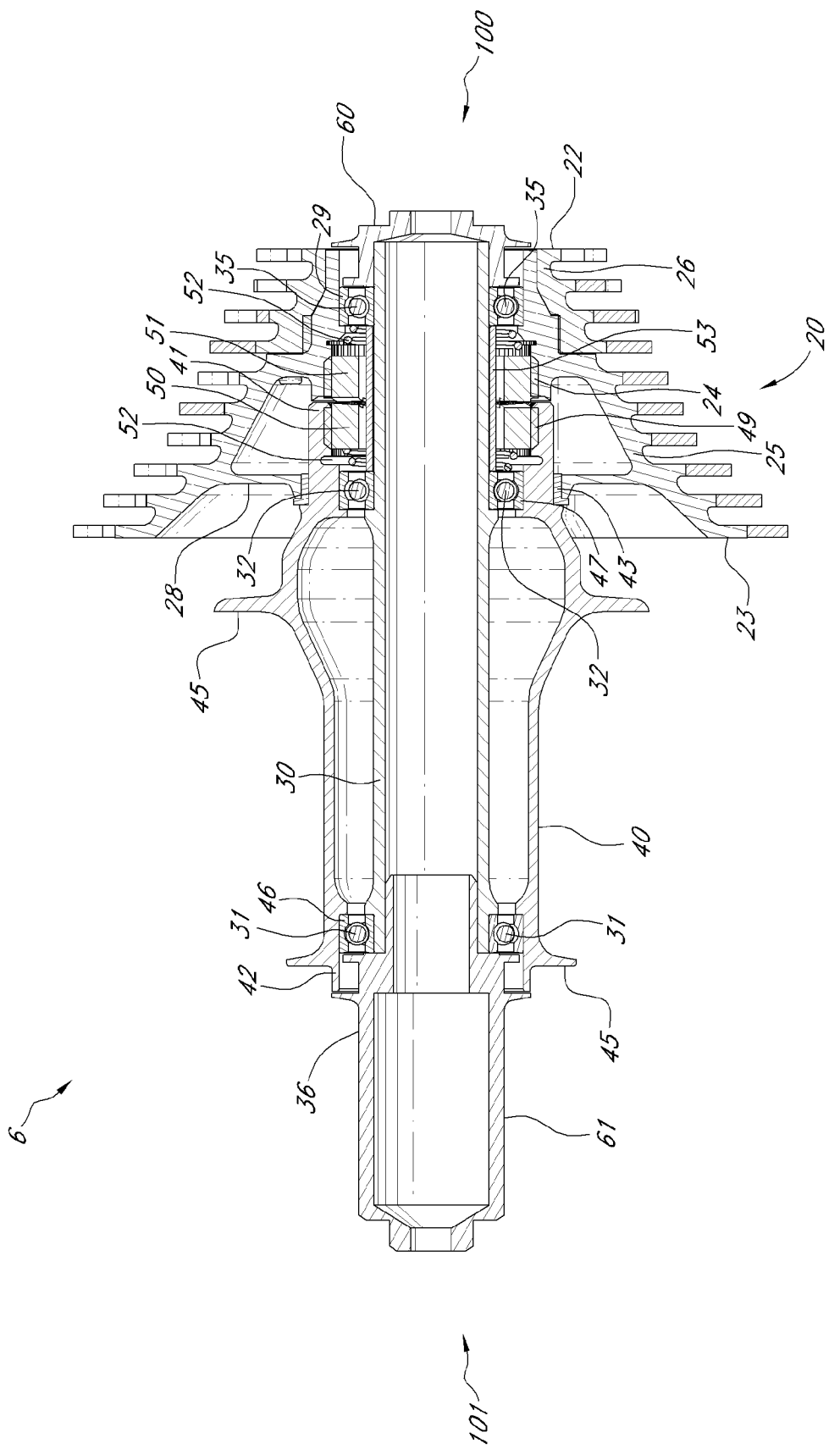
FIG. 3B depicts a side cross-sectional view of the cogset and hub assembly of FIG. 3A.

Referring to FIGS. 2B, 3A, and 3B, the cogset 20 can be located near a driven end 100 of the cogset and hub assembly 6 and the large end cap 61 can be located near a free end 101 of the cogset and hub assembly 6. The cogset 20 can be connected to a hub 40 at a hub facing end or inner end 23 of the cogset 20 and a sprocket facing end or first end 41 of the hub 40. The hub 40 further comprises a free end or second end 42 opposite the first end 41. At the free end 42 the hub 40 can connect to a large end cap 61 that can in turn connect to a connection means 70 for attaching the cogset and hub assembly 6 to the frame 11 via the stays 12 (not pictured in FIG. 3B). Alternatively, the hub 40 can connect directly to a connection means 70 (not pictured in FIG. 3B). As shown, the hub 40 further comprises two radially extending flanges 45, which can connect to a plurality of spokes 9 (shown in FIG. 1). The flanges 45 can be provided a set distance apart. For purposes of this application, "free end" is a broad term used broadly to distinguish the driven end 100, 41 and is not intended to mean that there are no items attached to or covering the free end 101, 42.

The cogs 21 are provided radially and can be grouped into circular sprockets. The cogs 21 on a sprocket can describe a radius or cog size which, in conjunction with the analogous radius or cog size of the pedal sprocket 5, determines a gear ratio.

The cogset 20 and hub 40 can be mounted on a shaft 36. The shaft 36 may comprise a shaft main body 30, a driven end cap 60, and a free end cap 61. In some embodiments, use of the end caps 60, 61 can be advantageous to provide a means of sealing the driven end 22 of the cogset 20 and the ends of the shaft main body 30. Further, in some embodiments, the use of end caps 60, 61 may provide for greater ease of manufacture and/or weight reduction advantages. Alternatively, in some embodiments, the shaft can comprise a single piece and/or one or both of the end caps 60, 61 can be eliminated.

The shaft 36 can be mounted by way of connection means 70 to stays 12. The distance between the stays 12 can define an assembly length LA along the axis of the cogset and hub assembly 6. As best shown in FIG. 3A, the length of the shaft 36 may span the entire assembly length LA. In addition, the shaft 36, including the end caps 60, 61, along with the hub 40 and the cogset 20 may span the entire assembly length LA.

As shown, the rear wheel cogset 20 can comprise a plurality of sprockets with different radii or cog sizes. Similarly, the pedal sprocket 5 can also comprise a plurality of sprockets with different radii or cog sizes. A greater number of sprockets can comprise a greater portion of the assembly length LA. Further, the cogs on the sprockets can be a set distance apart, both on a given sprocket and between sprockets. The cogs on adjacent sprockets can be at least a set distance apart so as to allow space for the chain 4 to surround each cog without causing interference with the cogs of an adjacent sprocket. Further, the cogs on a single sprocket can be a set radial distance apart on each sprocket so as to accommodate a single chain 4 designed to interact with all the sprockets of the cogset 20.

As depicted in 3A, the cogset and hub assembly 6 may be connected to two stays 12. The stays 12 may comprise generally forked shapes such that the cogset and hub assembly 6 can slide into position. The shaft 36 can then be rigidly held between the stays 12 by a connection means 70 so that the cogset and hub assembly 6 is secured to the bicycle 1. Said connection means 70 can comprise nuts and bolts, a quick-release, or any other means for creating a substantial force between the cogset and hub assembly 6 and the stays 12, such that frictional forces hold the assembly in place. The stays 12 can also comprise hooks, enclosures, or any other means to hold the cogset and hub assembly 6 in place.

Referring to FIGS. 2B, 3A and 3B, the hub 40 comprises an inner surface 48 defining an interior hub opening 81 configured to receive a shaft 36 and allow rotation of the hub relative to the shaft. Friction between the shaft 36 and hub 40 can be reduced with hub bearings 31, 32. Alternatively, bushings, lubricants, low-friction surfaces, rollers, or the like can also be used.

Referring to FIG. 2B, the cog-facing end 41 of the hub 40 can comprise a splined portion 49 configured to interact with the spline of a first axial ratchet portion 50 such that the rotation of the first axial ratchet portion causes an equivalent rotation of the hub and vice versa. The cogset 20 may define a splined portion 24 configured to interact with a second axial ratchet portion 51. The first axial ratchet portion 50 and the second axial ratchet portion 51 may each have teeth 56, 57, respectively. The teeth 56 of the first axial ratchet portion 50 may be axially facing and configured to interact with the desirably axially facing teeth 57 of a second axial ratchet portion 51. These axial ratchet portions 50, 51 can be biased together by a pair of springs 52 between which the axial ratchets are provided. When the axial ratchet portions 50, 51 are biased together their teeth 56, 57 interact such that the axial ratchets can rotate relative to one another in only one direction. Rotation of one axial ratchet in the opposite direction, while compelled against the other axial ratchet, will cause said other axial ratchet to also rotate in said opposite direction. By way of the splines, the ratchets 50, 51 can thus force similar rotational properties between the hub 40 and the cogset 20. The axial ratchets 50, 51 may rotate around the shaft 36 directly, or be spaced somewhat from the shaft 36 as shown here via a bushing 53. It will be clear from the description herein that other methods can be used to reduce friction between the axial ratchets 50, 51 and the shaft 36.

The cogset 20 can be configured and/or equipped to rotate about and mount onto the hub 40 and/or the shaft 36. The cogset 20 may mount onto the hub 40 at the cogset inner end 23 or, as shown, spaced somewhat outward from its inner end. In various embodiments, the cogset may be mounted onto the hub spaced at least ¼ inch, ½ inch, ¾ inch, 1 inch, ¼ inch, and 1½ inch from the inner end 23 of the cogset 20. The cogset 20 may be mounted on the hub spaced no more than ¼ inch, ½ inch, ¾ inch, 1 inch, ¼ inch, 1½ inch, 1¾ inch and 2 inches from the inner end 23 of the cogset 20. Typically, the inner end of the cogset 20 will be defined by the innermost cog of the cogset. Typically, this innermost cog will be the largest diameter cog of the cogset 20, but alternative configurations are possible, such as providing the largest diameter to the outermost cog. In various embodiments the sprocket facing end 41 of the hub 40 will extend into the cogset 20 at least ¼ inch, ½ inch, ¾ inch, 1 inch, 1½ inch, 1¾ inch, 2 inches, 2¼ inches, 2½ inches, 2¾ inches or 3 inches. A bushing 43 can be provided between the hub 40 and the cogset 20 to facilitate rotation and reduce friction between them. Other friction-reducing elements can be used. Similarly, the cogset 20 can mount on the shaft 36 at the outer end 22, as depicted here by way of cogset bearing 35. The cogset 20 can thus act as part of the hub 40.

As discussed above, at the ends 100, 101 of the cogset and hub assembly 6 can be provided end caps 60, 61. A short end cap 60 can be provided near the cogset 20 and a long end cap 61 can be provided near the hub 40. Thus, the spokes 9 connecting the hub 40 and the wheel 2 can be positioned near the center of the space between the stays 12. In some embodiments, the cogset 20 and the long end cap 61 may be shorter, allowing for a longer hub 40 or shorter assembly length LA. Providing a longer hub 40 may be undesirable due to increased weight. Similarly, providing a shorter assembly length LA may be desirable by providing a shorter moment arm on the shaft 36. It will be clear from the description herein that other factors may be considered in choosing the assembly length LA and the size of the hub 40.

In other embodiments the spokes 9 may be positioned substantially toward the free end 101 or to the driven end 100 of the assembly length LA. When the spokes 9 are positioned substantially toward the free end 101, more space can be available for the sprocket 20 and hub 40. The end caps 60, 61 can comprise, either integrally or in a separate part(s), connecting means 70 such as a nut and bolt to rigidly attach the cogset and hub assembly 6 to the stays 12.

Referring to FIG. 3B, the cogset 20 may mount directly, or substantially directly, onto the hub 40 and the shaft 36 by way of a bushing 43 and cogset bearing 35 respectively. Thus, in some embodiments, a separate sprocket carrier or other intermediary element is not necessary. Additionally, the cogset 20 can interact directly, or substantially directly, with the second axial ratchet portion 51 and the hub 40 without an intermediary element. As further shown, the end caps 60, 61 can provide a substantially complete seal, preventing the contamination of the bearings 31, 35, shaft 36, hub 40, cogset 20, or other elements of the cogset and hub assembly 6. As further shown, in some embodiments no lock ring is necessary to secure a free wheel body separate of the cog set.

Referring to FIGS. 2B and 3B, the cogset 20 may comprise an inner surface 80 of variable size. Said inner surface 80 may define a cross-sectional opening which increases in size from the outer end 22 to the inner end 23 generally monotonically, substantially monotonically, or in some other way. The profile of the diameter of the inner surface 80 of the cogset 20 may generally match the profile of the diameter of the cogs of the cogset 20.

Extending inward from the inner surface 80 may be a mounting portion or post 28. As shown, the mounting post 28 can provide the interface between the cogset 20 and the hub 40, via the bushing 43. The mounting post 28 may extend angularly completely around the bushing 43, comprising a shape similar to a disc. Alternatively, the mounting post 28 may comprise a plurality of posts comprising spoke-like structures. Further, the position of the mounting post 28 along the axis of the cogset and hub assembly 6 may vary. As shown in FIG. 3B the mounting post 28 is positioned within the interior of the cogset 20. In other embodiments the mounting post 28 can sit further toward the hub facing end 23 of the cogset 20 or further toward the outer end 22, near the ratchets 50, 51. As to be discussed further below, varying the position of the mounting post 28 can allow greater flexibility in the design of the cogset and hub assembly 6, such as allowing for larger ratchets 50, 51.

With respect to FIG. 3B, the cogset 20 and hub 40 can further comprise seats 29, 46, 47 for the bearings 31, 32, 35. The cogset 20 can comprise a seat 29 along its interior to receive a cogset bearing 35 that can allow rotation about the shaft 36. Similarly, the hub 40 can comprise hub bearing seats 46, 47 to receive hub bearings 31, 32 that can allow rotation about the shaft 36. In one embodiment, the cogset 20 may define an outermost drive end cogset bearing seat 29 which receives cogset bearing 35. In some embodiments, the hub 40 can comprise a free end bearing seat 46 for receiving a free-end bearing 31. In some embodiments, the hub 40 can define a driven end hub bearing seat 47 for receiving a driven end hub bearing 32. In some embodiments, as illustrated, the driven end hub bearing 32 may be spaced outward from the driven end hub flange 45 of the hub 40 and may be spaced outward from the inner end 23 of the cogset 20. In particular, the driven end bearing seat 47 and driven end hub bearing 32 may be positioned at least ¼ inch, ½ inch, ¾ inch, 1 inch, ¼ inch, 1½ inch, 1¾ inch and 2 inches from the inner end 23 of the cogset 20. In various embodiments, the driven end hub bearing seat 47 and driven end hub bearing 32 may be mounted on the hub spaced no more than ¼ inch, ½ inch, ¾ inch, 1 inch, ¼ inch, 1½ inch, 1¾ inch and 2 inches from the inner end 23 of the cogset 20. In various embodiments the sprocket facing end 41 of the hub 40 will not extend beyond the driven end hub bearing 32 or will extend beyond the driven end hub bearing 32 at least ¼ inches, ½ inch, ¾ inch, 1 inch, 1½ inch, 1¾ inch, 2 inches, 2¼ inches, 2½ inches, 2¾ inches or 3 inches. The driven end hub bearing 32 and driven end hub bearing seat 47 may be of variable size, material, and fit depending on the loads that must be born while supporting the weight of the bicycle 1 and its cargo, and during rotation.

The free end hub bearing seat 46 and the free end hub bearing 31 may comprise similar positions relative to the free end 42 of the hub 40. For example, the free end hub bearing seat 46 and free end hub bearing 31 may be positioned at least ¼ inch, ½ inch, ¾ inch, 1 inch, ¼ inch, 1½ inch, 1¾ inch, 2 inches, 2¼ inches, 2½ inches, 2¾ inches, and 3 inches from the free end 42 of the hub 40. In various embodiments, the free end hub bearing seat 46 and free end hub bearing 31 may be mounted on the hub spaced no more than ¼ inch, ½ inch, ¾ inch, 1 inch, ¼ inch, 1½ inch, 1¾ inch, 2 inches, 2¼ inches, 2½ inches, 2¾ inches, and 3 inches from the free end 42 of the hub 40. Further, the free end hub bearing seat 46 and the free end hub bearing 31 may similarly comprise size, material, and fit depending on the loads that must be born while supporting the weight of the bicycle 1 and its cargo, and during rotation.

The cogset bearing seat 29 and cogset bearing 35 may comprise similar positions relative to the driven end 23 of the cogset 20 and the stay 12 on the driven end 100 of the cogset and hub assembly 6. For example, the cogset bearing seat 29 and cogset bearing 35 may be positioned no more than ¼ inch, ½ inch, ¾ inch, 1 inch, ¼ inch, 1½ inch, 1¾ inch and 2 inches from the driven end 23 of the cogset 20. In various embodiments, the cogset bearing seat 29 and cogset bearing 35 may be mounted on the cogset spaced no more than ¼ inch, ½ inch, ¾ inch, 1 inch, ¼ inch, 1½ inch, 1¾ inch and 2 inches from the driven end 100 of the cogset and hub assembly 6. Further, the cogset bearing seat 29 and the cogset bearing 35 may similarly comprise size, material, and fit depending on the loads that must be born while supporting the weight of the bicycle 1 and its cargo, and during rotation.

The bearing seats 29, 46, 47 and the bearings 31, 32, 35 can have a wide stance. For example, the cogset and driven end hub bearing seats 29, 47 and/or the cogset and driven end hub bearings 32, 35 can be positioned at least outside of the hub flange 45 and/or inside the cogset 20. The cogset and free end hub bearing seats 29, 46 and/or the cogset and free end hub bearings 31, 35 can be spaced apart at least two-thirds the combined length of the cogset 20 and hub main body 40. The driven end and free end hub bearing seats 45, 46 and/or the driven end and free end hub bearings 31, 32 can be spaced apart at least ½ the combined length of the cogset 20 and hub main body 40.

In some embodiments the cogset and hub assemblies 6 described herein may comprise a wide variety of materials, sizes, shapes, and or configurations. Because in some embodiments the cogset 20 can mount directly or substantially directly onto the hub 40 and/or shaft 36 without an intermediary element such as a sprocket carrier, the cogset's inner diameter can be approximately equal to the outer diameter of the hub 40 and/or the shaft 36. Thus, in some embodiments the cog size may be substantially smaller while mounted on a shaft 36 compared to prior art cogset and hub assemblies. For example, a cogset and hub assembly 6 mounted on a shaft 36 may comprise at least one sprocket comprising an inner diameter less than 1%, 2%, 3%, 5%, 7%, 10%, or 15% greater than the diameter of the shaft 36 upon which the cogset and hub assembly 6 is mounted. Further, the shaft 36 may comprise a diameter not less than 1 inch, 1½ inch, 1¾ inch, 2 inches, 2¼ inches, 2½ inches, 2¾ inches, 3 inches, 15 mm, 16 mm, 17 mm, 18 mm, 19 mm, or 2 cm. Alternatively, the shaft may have an external diameter less than 1 inch, ⅞ inch, ¾ inch, ⅝ inch, or ½ inch. The shaft 36 may further comprise a lighter material such as carbon fiber, steel, aluminum, plastics, titanium, and the like. The cogset 20 may further be mounted directly or substantially directly onto load bearings which similarly mount onto the hub 40 and/or shaft 36.

Further, the size of the load bearings 31, 32, 35 may be altered. As shown in FIG. 3B, the bearings 31, 32, 35 can be positioned relatively wide along the axis of the cogset and hub assembly 6. The load bearings 31, 32, 35 can comprise a bearing diameter of approximately 9/16 inch. Alternatively, the load bearings can comprise a bearing diameter greater than 9/16 inch. Further, the balls in the load bearings 31, 32, 35 may comprise a ball bearing diameter less than 1/32 inch, 1/64 inch, 1/128 inch, 3/128 inch, 0.8 mm, 0.6 mm, 0.4 mm, or 0.2 mm. Further, the load bearings 31, 32, 35 and their respective balls may comprise different sizes.

Further, the bearings 31, 32, 35 and bearing seats 29, 46, 47 can be positioned at varying points along the axis of the cogset and hub assembly 6. For example, the cogset bearings 35 can be positioned within 1%, 2%, 3%, 5%, 7%, or 10% of the assembly length LA from the driven end 100 of the cogset and hub assembly 6. Similarly, the hub bearings 31, 32 may be positioned within 1%, 2%, 3%, 5%, 7%, or 10% of the assembly length LA from the corresponding ends of the hub 40.

Further, the ratchet portions 50, 51 used may comprise a larger size. For example, the axial ratchet portions 50, 51 depicted in FIG. 3B may comprise a larger size, in this instance by providing them further toward the inner end 23 of the cogset 20 and similarly providing the mounting post 28 further toward the inner end 23 of the cogset 20. The ratchet portions 50, 51 may comprise 18 teeth 56, 57 with a ratchet surface area of 0.22 square inches. As can be seen from FIG. 3B, ample space can be provided within the cogset and hub assembly 6 depicted for much larger axial ratchet portions 50, 51. For example, the ratchet portions 50, 51 may comprise more than 18 teeth 56, 57 and/or have a ratchet surface area of greater than 0.22 square inches. Further, the axial ratchet portions 50, 51 can, comprise lighter materials, a greater number of teeth per degree of rotation, and further design changes.

Further, the assembly length LA can be distributed varyingly between the parts of the cogset and hub assembly 6. For example, the hub 40 can be made shorter or be more substantially overlapped by the cogset 20. Further, the cogset 20 may be within ¼ inch, ½ inch, ¾ inch, 1 inch, 1½ inch, 1¾ inch, 2 inches, 2¼ inches, 2½ inches, 2¾ inches or 3 inches of the spokes 9. Further, the axis length LA may be divided, for example, such that the large end cap generally comprises 10%, 20%, 30%, or 40% of the axis length, the distance between the flanges 45 connecting to the spokes generally comprise 10%, 20%, 30%, 40%, 50%, 60%, or 70%, and/or the cogset generally comprises 10%, 20%, 30%, or 40% of LA.

Further flexibility can be provided by varying the distance between cogs on adjacent sprockets of the cogset 20. For example, increasing the distance between cogs on adjacent sprockets can allow lighter materials to be used. Alternatively, decreasing the distance between cogs on adjacent sprockets can allow a greater number of sprockets on the cogset 20. In some embodiments the cogset 20 may comprise greater than 9, 10, 11, 12, 13, 14, or 15 sprockets.

Figure 5:
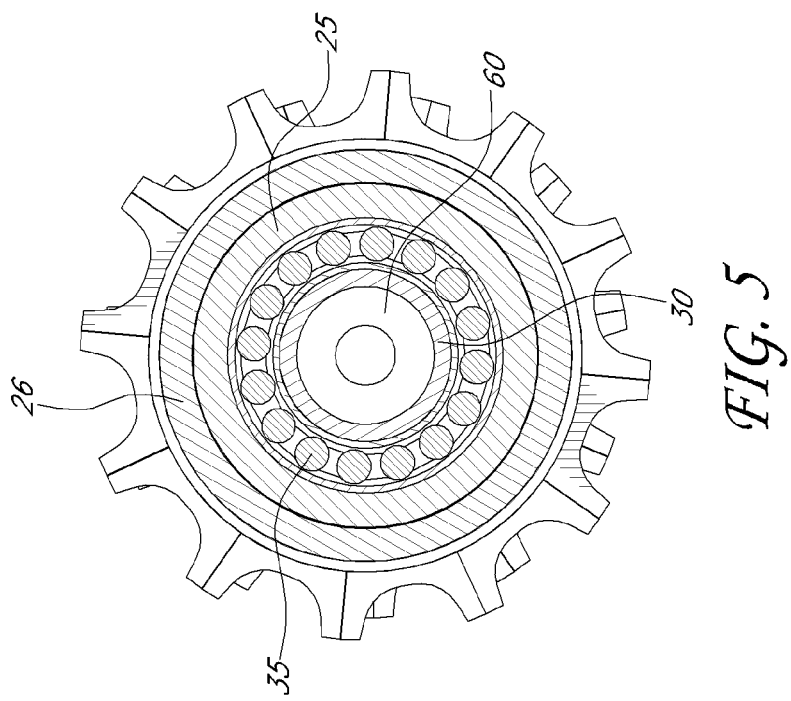
FIGS. 4 and 5 depict axial cross-sectional views of the cogset and hub assembly of FIG. 3A along 4-4 and 5-5, respectively.
Figure 4:
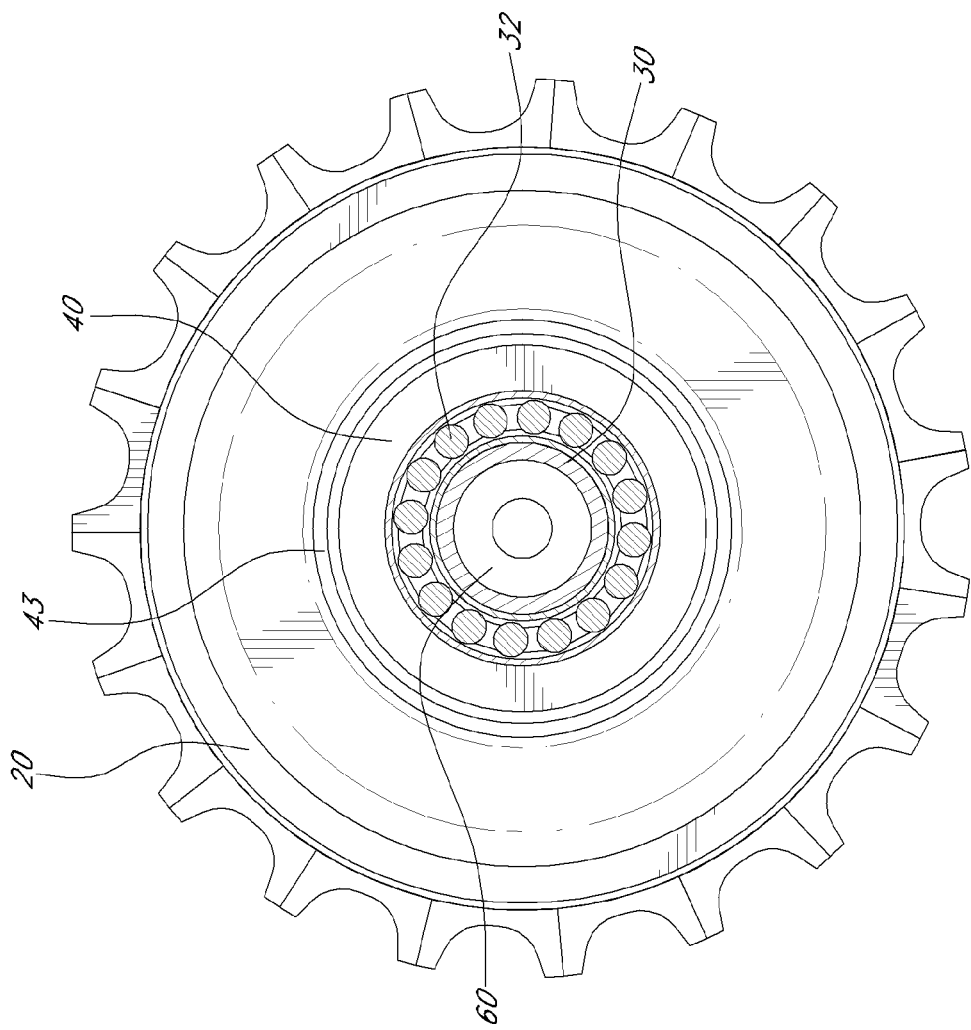

As shown in FIG. 4, the cogset 20 can mount almost directly onto the hub 40, with only a bushing 43 in between to reduce friction. The hub 40 can in turn mount onto the shaft 36 with a set of hub bearings 31, 32 to reduce friction. As shown in FIG. 5, the cogset 20 can mount almost directly onto the shaft 36, with only cogset bearings 35 in between to reduce friction. In other embodiments it may be desirable to distance the cogset 20 from the cogset bearings 35. This distance may be approximately 1/32 inch, 1/64 inch, 1/128 inch, or 1/256 inch. Similarly, the distance may be no more than ½ mm.

Figure 6:
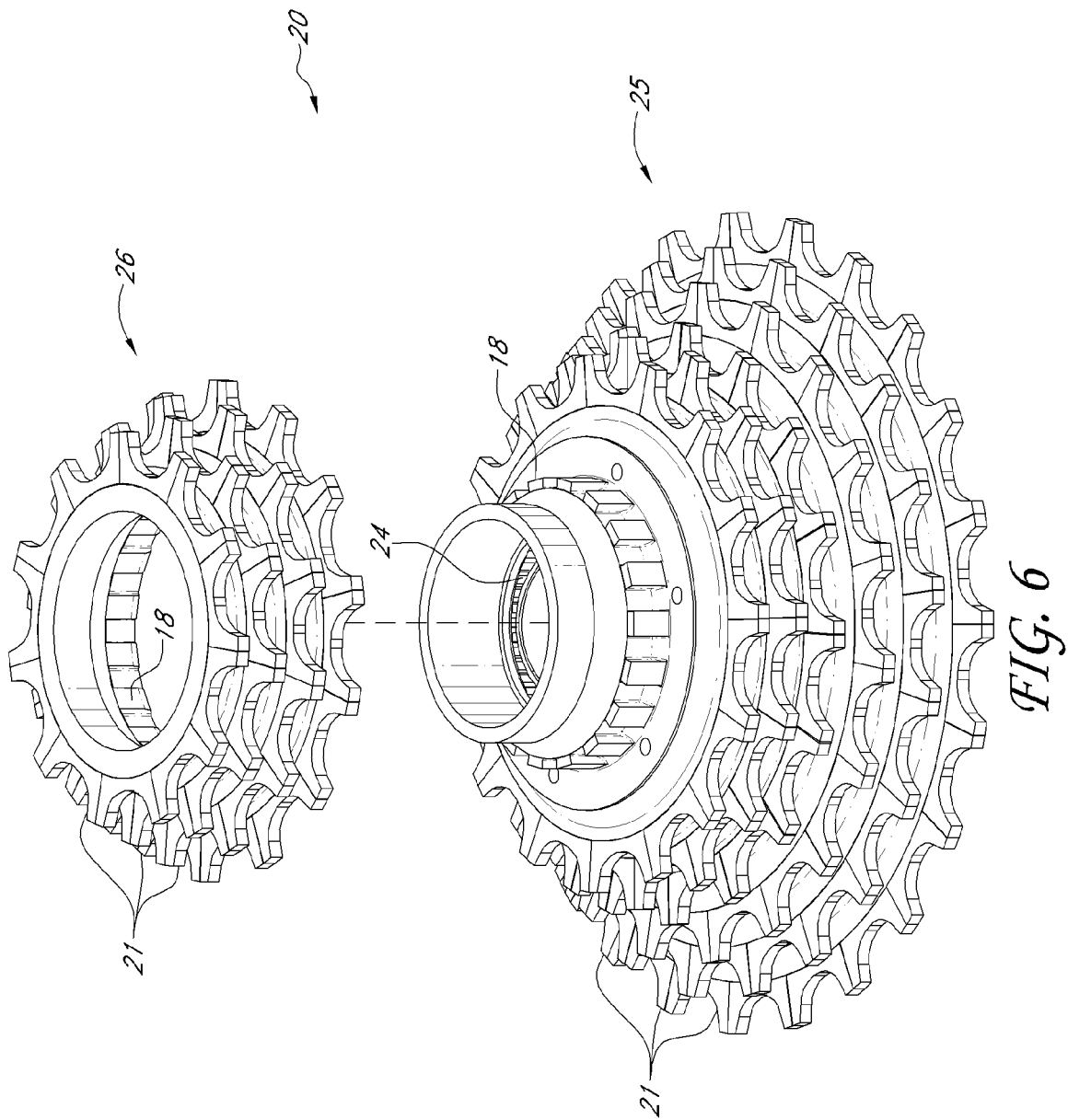
FIG. 6 depicts an exploded view of a cogset assembly.

Referring to FIG. 6, one embodiment of the cogset 20 can comprise two pieces 25, 26 attached by cogset spline portions 18 to cause co-rotation. The pieces can be further connected by screws, welds, adhesives, or any other connecting means known in the art or combination thereof. The first cogset 25 can comprise a distinct material from the second cogset 26. For example, the first cogset 25 can comprise aluminum, titanium, steel, and/or carbon fiber. The second cogset 26 can comprise steel and/or titanium. Generally, the second cogset 26 can comprise a heavier and/or stronger material than the first cogset 25. Further, the second cogset 26 may connect with the cogset and hub assembly 6 via the first cogset 25. The second cogset 26 may comprise cog sizes from 11 to 14. The first cogset 25 may comprise cog sizes from 15 to 20. In other embodiments, the first cogset may comprise cog sizes lower than 11 while the second cogset may comprise cog sizes greater than 26. As shown, the first cogset 25 may further comprise a spline portion 24 within its interior.

Figure 7A:
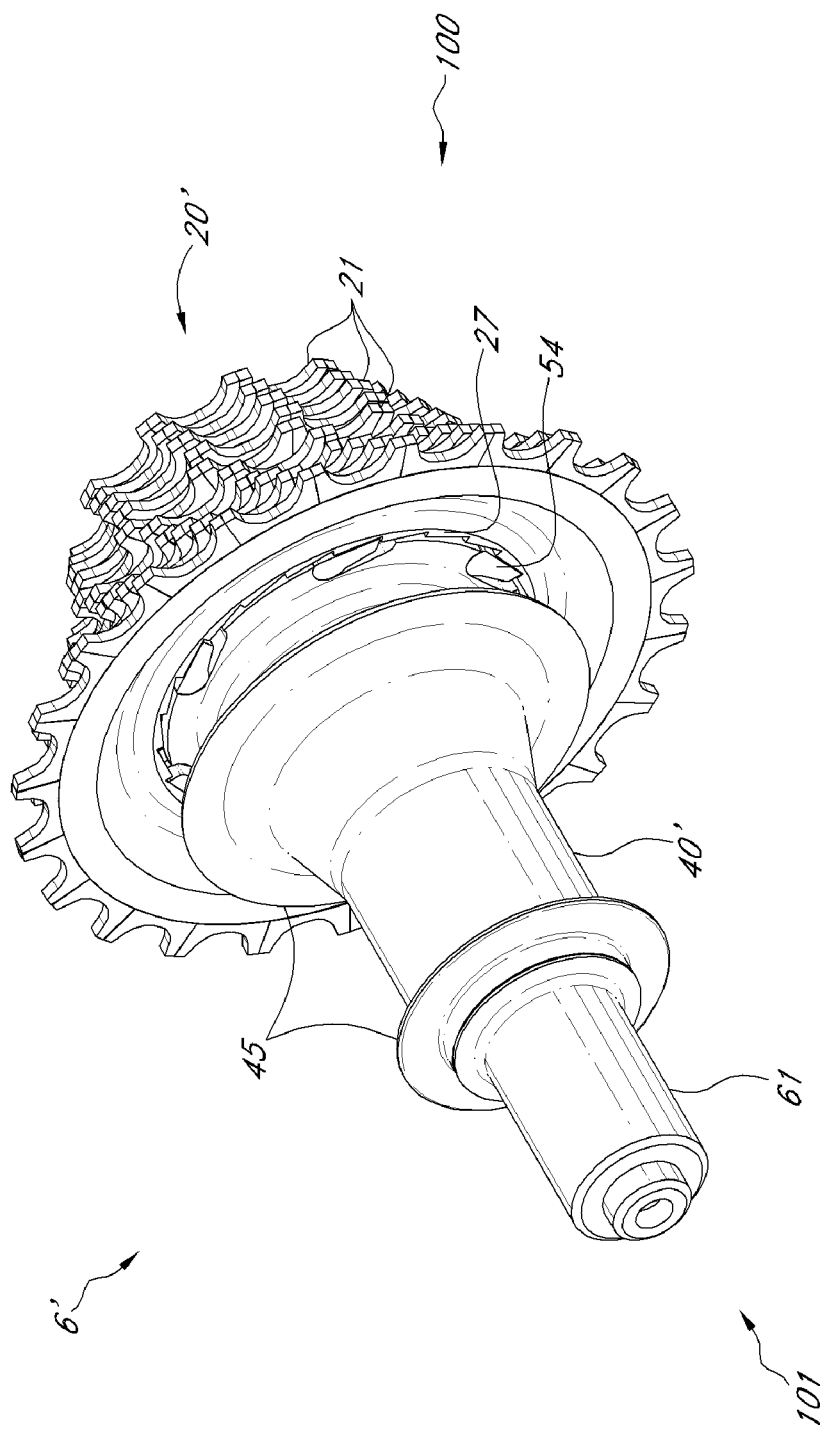
FIG. 7A depicts a perspective view of an alternative embodiment of a cogset and hub assembly.
Figure 7B:
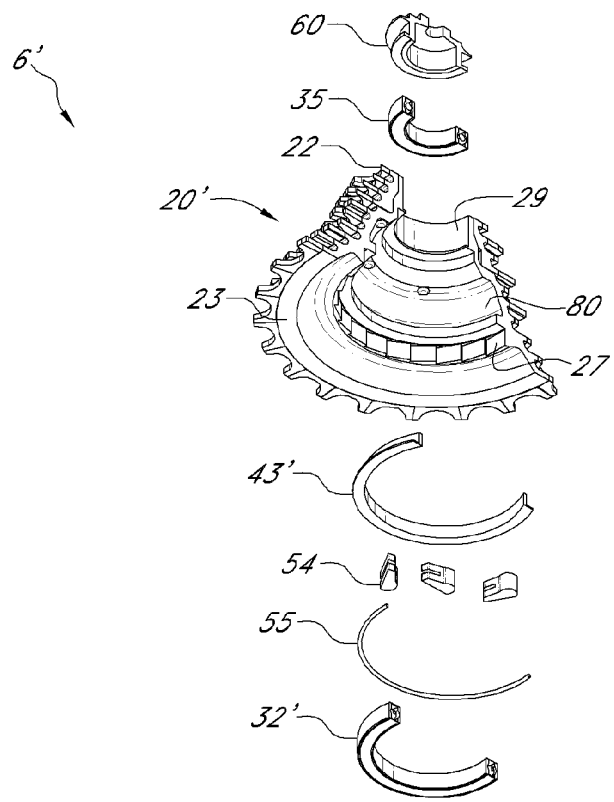
FIG. 7B depicts an exploded cross-sectional view of the cogset and hub assembly of FIG. 7A.
Figure 7B:
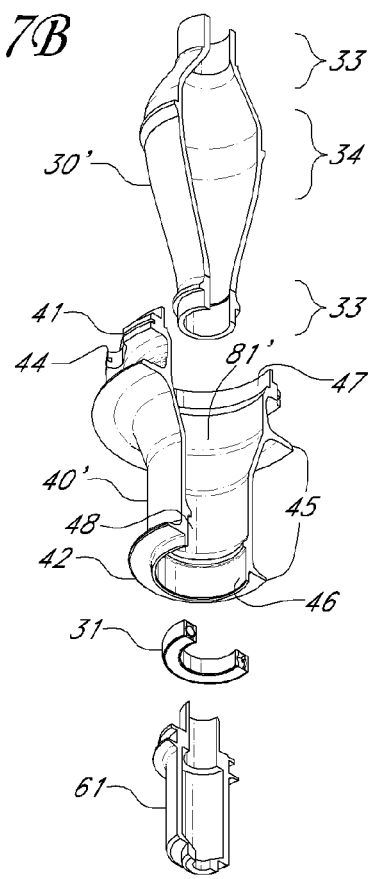
Figure 8A:
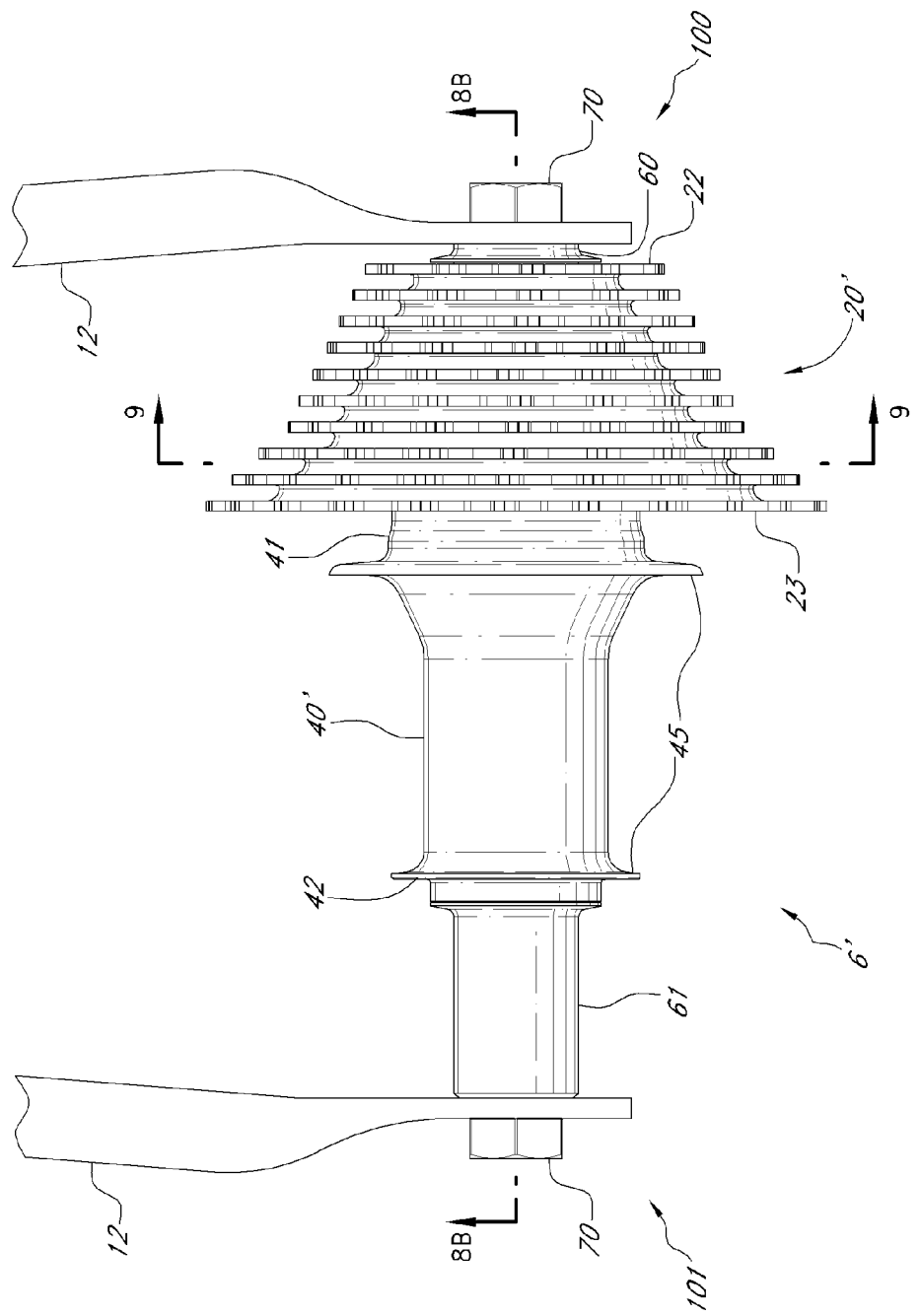
FIG. 8A depicts a side view of a cogset and hub assembly of FIG. 7A.

FIGS. 7A and 8A depict a perspective view and a side view of an alternative embodiment of a cogset and hub assembly 6'. As shown in FIG. 7A, the assembly 6' can comprise a first ratchet portion such as a plurality of radially extending pawls 54 configured to interact with a second ratchet portion, such as a radially facing ratchet portion of a cogset 20'. Referring to FIG. 7B, the shaft main body 30' may comprise larger and smaller diameter portions 33, 34. The larger diameter portion 34 of the shaft main body 30' may be associated with a larger diameter portion of the hub 40'. Similarly, the driven end hub bearing 32' corresponding to said larger diameter portion 34 may also be larger. The shaft main body 30' may further comprise smaller diameter portions 33 on either end of the larger diameter portion 34, which can interface with the outer end 22 of the cogset 20' and/or the second end 42 of the hub 40'.

As shown in FIG. 7B, the hub 40' may further comprise a pawl receiving portion 44. The pawl receiving portion 44 may be configured to accommodate at least one pawl 54 and a pawl spring 55. The pawls 54 may rotate about a connection with the hub 40 and can be compelled to rotate outward by the pawl spring 55. Alternatively, multiple springs may be used. The pawls 54 and the pawl spring 55 can be configured to interact with a ratchet portion 27 of the cogset 20' such that the cogset 20' may rotate in only one direction relative the pawls 54. Upon rotation of the cogset 20' in the other direction, the interaction between the pawls 54 and the ratchet portion 27 can cause the hub 40' to also rotate in said opposite direction.

Figure 8B:
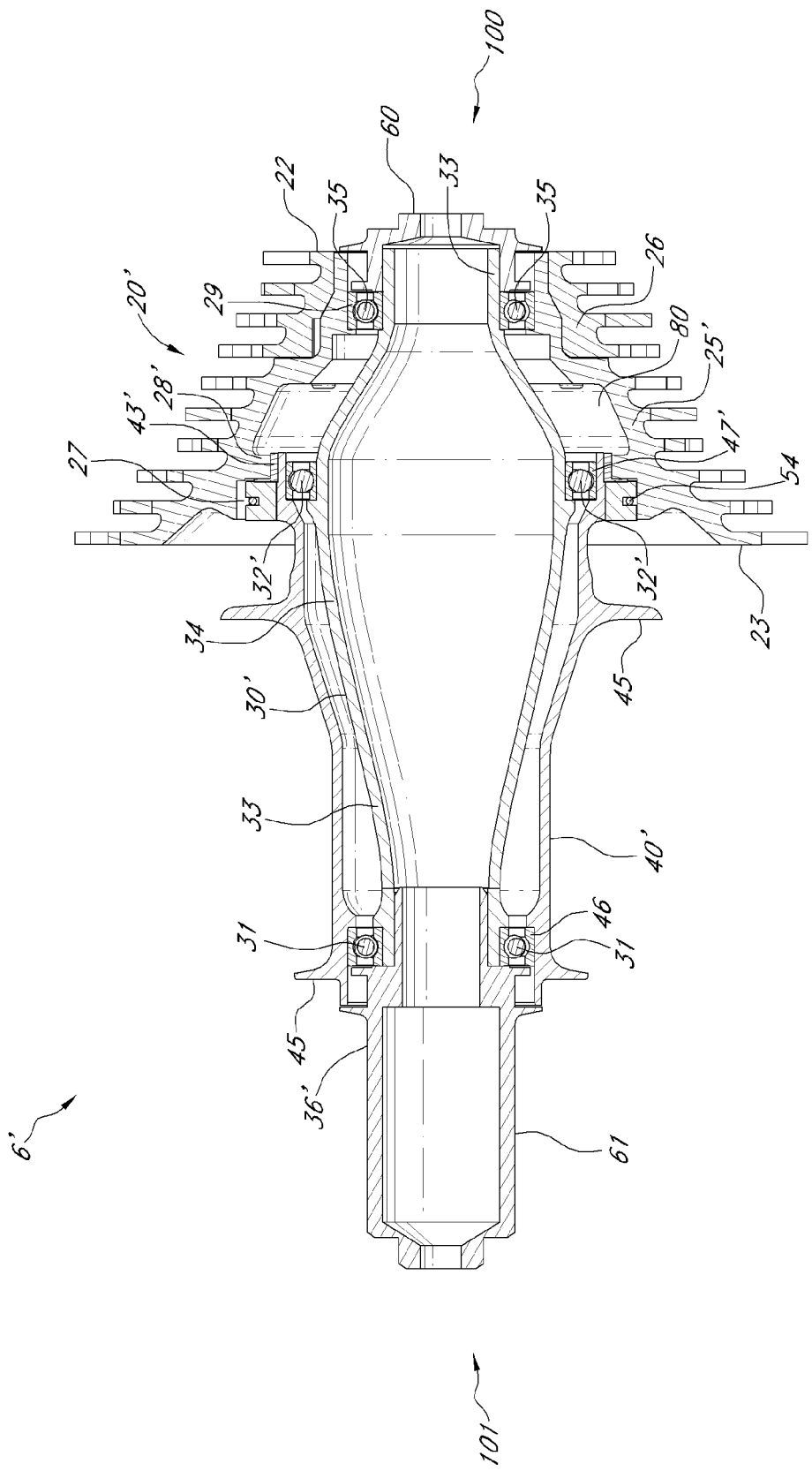
FIG. 8B depicts a side cross-sectional view of the cogset and hub assembly of FIG. 8A.

Referring to FIG. 8B, the shaft 36' can comprise a larger diameter portion 34 near the pawls 54 of the hub 40'. As further shown, the larger diameter portion 34 may be accommodated by larger diameter portions of the hub 40' and cogset 20'. If desirable, the shaft size may comprise a different diameter profile, such as a larger diameter along the full length of the hub 40'.

In this embodiment, the mounting post 28' can be substantially shorter to accommodate the reduced clearance between the general profile of the inner surface 80 of the cogset 20' and the shaft 36'. The mounting post 28' may comprise different shapes and positions as discussed above with mounting post 28. For example, in this embodiment the mounting post 28' may alternatively be positioned further toward the outer end 22 of the cogset 20' or further toward the hub-facing end 23. In either case the mounting post 28' may further comprise a greater length.

Figure 9:
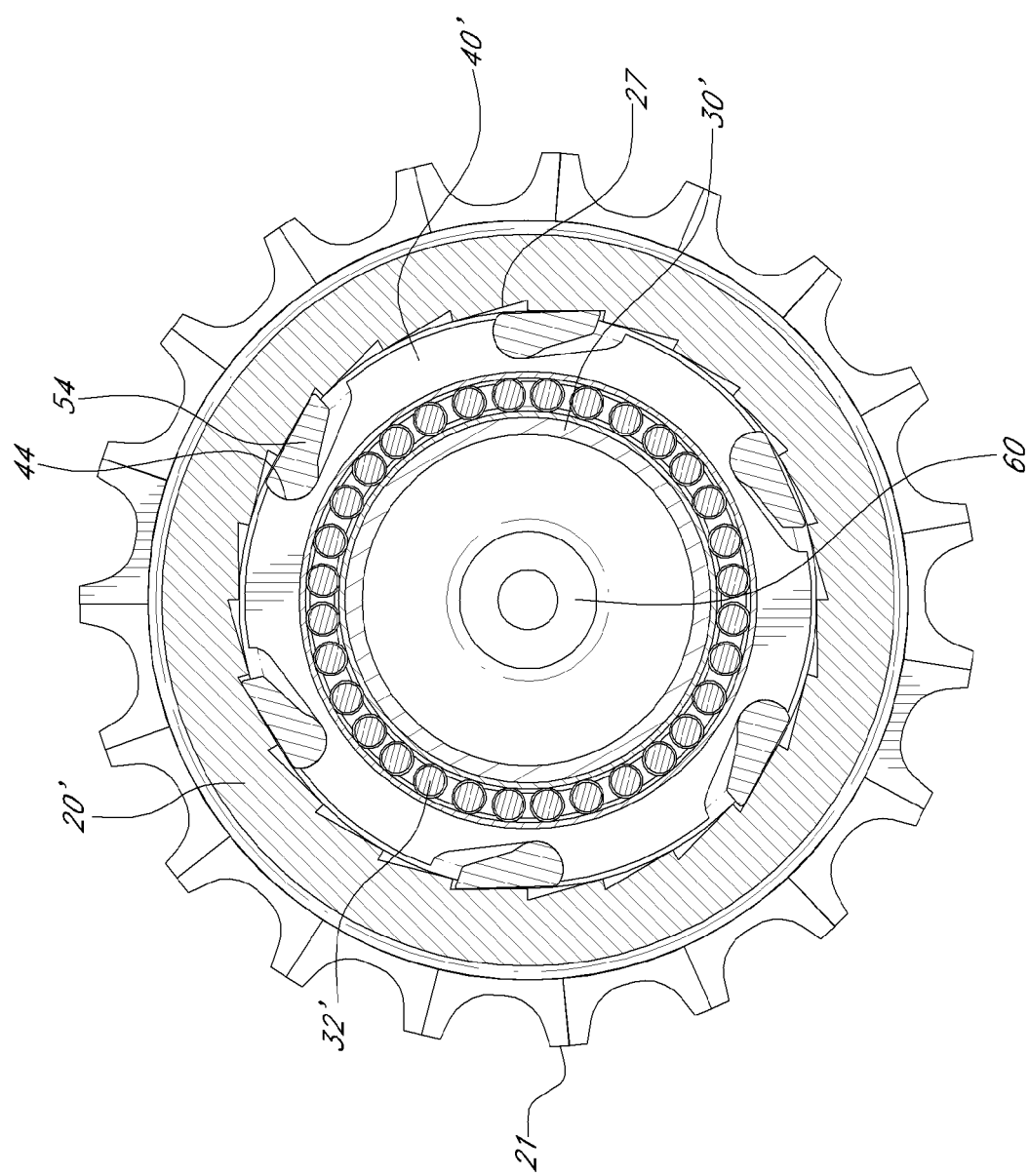
FIG. 9 depicts an axial cross-sectional view of the cogset and hub assembly of FIG. 8A along 9-9.

FIG. 9 depicts a cross-sectional view of a cogset and hub assembly 6'. As shown, the cogset 20' can comprise one or more ratchet teeth. The ratchet teeth can engage with one or more pawls 54 mounted on the hub 40' such that rotation between the hub 40' and cogset 20' may be achieved in only one direction. The hub 40' can be mounted on the shaft 36' by way of hub bearings 31, 32'. As shown, the shaft diameter can decrease in stages. The shaft 36' can terminate at an end cap 60, 61.

Figure 10:
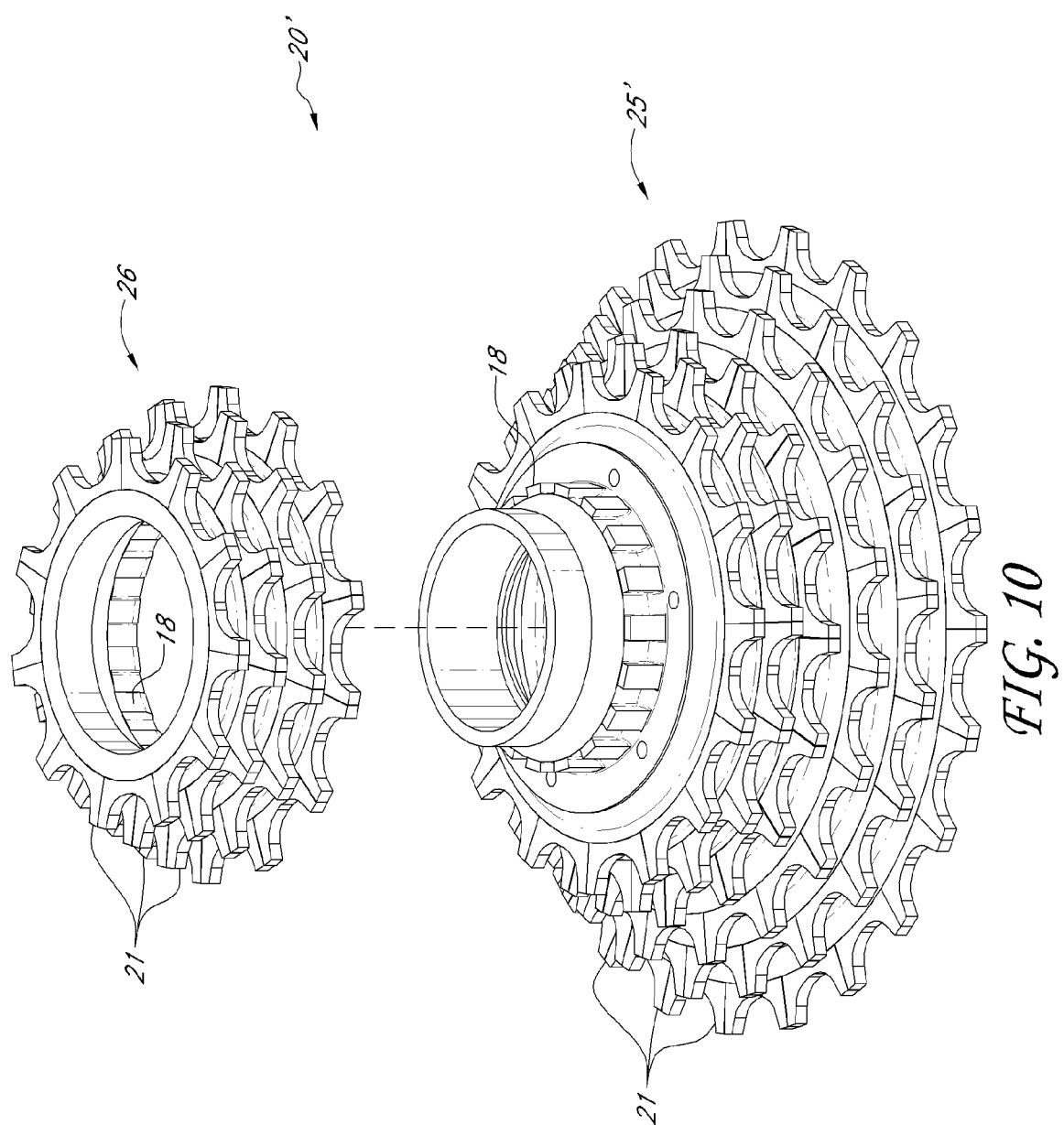
FIG. 10 depicts an exploded view of a cogset assembly.

FIG. 10 depicts an exploded view of a cogset 20'. As shown, the cogset 20' can comprise two pieces 25', 26 attached by cogset spline portions 18 to cause co-rotation, as in FIG. 6.

In some embodiments the cogset and hub assemblies 6' described herein may comprise a wide variety of materials, sizes, shapes, and or configurations. Because in some embodiments the cogset 20' can mount directly or substantially directly onto the hub 40' and/or shaft 36' without an intermediary element such as a sprocket carrier, the cogset's inner diameter can be approximately equal to the outer diameter of the hub 40' and/or the shaft 36'. Thus, in some embodiments the cog size may be substantially smaller while mounted on a shaft 36' compared to prior art cogset and hub assemblies. For example, a cogset and hub assembly 6' mounted on a shaft 36' may comprise at least one sprocket comprising an inner diameter less than 1%, 2%, 3%, 5%, 7%, 10%, or 15% greater than the diameter of the shaft 36' upon which the cogset and hub assembly 6' is mounted. The cogset 20' may further be mounted directly or substantially directly onto load bearings 35 which similarly mount onto the hub 40' and/or shaft 36'.

Further, the shaft 36' may comprise a portion with a relatively large diameter. For example, a cogset and hub assembly 6' mounted on a shaft 36' may comprise at least one sprocket comprising an inner diameter less than 1%, 2%, 3%, 5%, 7%, 10%, or 15% greater than the diameter of the shaft 36' corresponding to said sprocket. More generally, the shaft 36' may comprise an average external diameter greater than 1 inch, 1½ inch, 1¾ inch, 2 inches, 2¼ inches, 2½ inches, 2¾ inches, 3 inches, 15 mm, 16 mm, 17 mm, 18 mm, 19 mm, or 2 cm. Alternatively, the shaft may comprise an external diameter less than 1 inch, ⅞ inch, ¾ inch, ⅝ inch, or ½ inch. Further, the shaft may comprise a larger diameter portion 34 with diameter greater than 125%, 150%, 175%, 200%, 225%, 250%, 275%, or 300% wider than a smaller diameter portion 33 of the shaft 36' and/or the shaft main body 30'. Alternatively, the shaft may comprise a maximum external diameter greater than 1 inch, 1½ inch, 1¾ inch, 2 inches, 2¼ inches, 2½ inches, 2¾ inches, or 3 inches. Further, the shaft may comprise a minimum external diameter less than 1 inch, ⅞ inch, ¾ inch, ⅝ inch, ½ inch, ⅜ inch, or ¼ inch. The shaft 36' may further comprise a lighter material such as carbon fiber, aluminum, titanium, plastics, and the like.

Further, the size of the load bearings 31, 32', 35 may be altered. As shown in FIG. 8B, the bearings 31, 32', 35 can be positioned relatively wide along the axis of the cogset and hub assembly 6'. The load bearings 31, 32', 35 can comprise a bearing diameter of approximately 9/16 inch. Alternatively, the load bearings can comprise a bearing diameter greater than 9/16 inch. Further, the balls in the load bearings 31, 32', 35 may comprise a bearing diameter less than 1/32 inch, 1/64 inch, 1/128 inch, 3/128 inch, 0.8 mm, 0.6 mm, 0.4 mm, or 0.2 mm. Further, the load bearings 31, 32', 35 may comprise different sizes. For example, the driven end hub bearing 32' can comprise a larger bearing diameter than the other bearings 31, 35. Similarly, the driven end hub bearing 32' can hold balls with diameter smaller than the other bearings 31, 35.

Further, the bearings 31, 32', 35 and bearing seats 29, 46, 47' can be positioned at varying points along the axis of the cogset and hub assembly 6'. For example, the cogset bearings 35 can be positioned within 1%, 2%, 3%, 5%, 7%, or 10% of the assembly length LA from the driven end 100 of the cogset and hub assembly 6. Similarly, the hub bearings 31, 32' may be positioned within 1%, 2%, 3%, 5%, 7%, or 10% of the assembly length LA from the ends 41, 42 of the hub 40'.

Further, the ratchets 54, 55, 27 used may comprise a larger size. For example, in FIG. 8B the shaft size may be reduced to allow for a larger ratchet. The pawls 54 may be made as large as at least ¼ inches, ½ inch, ¾ inch, or 1 inch. The pawls 54 may comprise a lighter material such as carbon fiber, aluminum, titanium, or the like and still be capable of bearing the same load due to their increased size. The ratchet may additionally comprise a greater number of ratchet teeth per degree of rotation. Further, the ratchets can, as in preceding discussions, comprise lighter materials, a greater number of teeth per degree of rotation, and further design changes.

Further, the assembly length LA can be distributed varyingly between the parts of the cogset and hub assembly 6'. For example, the hub 40' can be made shorter or be more substantially overlapped by the cogset 20'. Further, the cogset 20' may be within ¼ inch, ½ inch, ¾ inch, 1 inch, 1½ inch, 1¾ inch, 2 inches, 2¼ inches, 2½ inches, 2¾ inches or 3 inches of the spokes 9. Further, the axis length LA may be divided, for example, such that the large end cap generally comprises 10%, 20%, 30%, or 40% of the axis length, the distance between the flanges 45 connecting to the spokes generally comprise 10%, 20%, 30%, 40%, 50%, 60%, or 70%, and/or the cogset generally comprises 10%, 20%, 30%, or 40%.

Further flexibility can be provided by varying the distance between cogs on adjacent sprockets of the cogset 20'. For example, increasing the distance between cogs on adjacent sprockets can allow a larger chain 4, which may further comprise lighter materials. Alternatively, decreasing the distance between cogs on adjacent sprockets can allow a greater number of sprockets on the cogset 20'. In some embodiments the cogset 20' may comprise greater than 9, 10, 11, 12, 13, 14, or 15 sprockets.

As shown, the alternative embodiments depicted herein may comprise distinct, equivalent, and altered parts. It will be clear from the disclosure herein that parts that have only slight differences between embodiments may still perform the same function. For example, shafts 36, 36' comprise different shapes but can still perform at least one shared function, namely providing rotational support to the other parts of the cogset and hub assemblies 6, 6'. Further, parts with distinct morphologies may still perform substantially equivalent functions. For example, the ratchet elements of FIGS. 2B, 3B and the ratchet elements of FIGS. 7B, 8B comprise very distinct parts, but are both capable of controlling the relative rotational properties of the hubs 40, 40' and cogsets 20, 20'. It will further be clear from the disclosure herein that the specific dimensions, cog sizes, and materials attributed to one embodiment may further be attributable to another embodiment. For example, although the shaft 30 in FIG. 2B is different from the shaft 30' in FIG. 7B, it will be clear that the cogset and hub assembly 6 of FIG. 2B could be modified to accommodate the shaft 30', while still maintaining other differences between the cogset and hub assemblies 6, 6'.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A bicycle hub assembly comprising:
   a continuous, hollow, one-piece shaft;
   a first load bearing directly mounted to said shaft;
   a second load bearing directly mounted to said shaft;
   a hub main body surrounding said shaft, said hub main body defining an inner surface defining a seat configured to be directly mounted to said second load bearing;
   a cogset, the cogset defining an inner surface, said inner surface defining a seat configured to be directly mounted to said first load bearing; and
   a ratchet transmitting torque between said cogset and said hub.

2. The hub assembly of claim 1, wherein said inner surface of said cogset defines an opening of variable size.

3. The hub assembly of claim 2, wherein said cogset defines an inner end and an outer end, and said opening generally increases in size from said outer end to said inner end.

4. The hub assembly of claim 2, wherein said inner surface of said cogset defines a first mounting portion and a second mounting portion, said first mounting portion defining a smaller open cross-section than said second mounting portion, said first mounting portion cooperating to rotatably mount said cogset on said shaft and said second mounting portion cooperating to mount said cogset on said hub assembly.

5. The hub assembly of claim 4, wherein said shaft defines an outer surface, said outer surface defining a first portion adjacent said outer end of said cogset and a second portion adjacent said inner end of said cogset, the first portion having a smaller diameter than the second portion.

6. The hub assembly of claim 5, wherein said shaft further defines a third portion opposite said outer end of said cogset, said third portion having a diameter smaller than the second portion.

7. The hub assembly of claim 1, wherein the ratchet comprises a ratchet portion mounted on said hub main body.

8. The hub assembly of claim 7, wherein the ratchet further comprises a ratchet portion mounted on said cogset, corresponding to the ratchet portion mounted on the hub.

9. The hub assembly of claim 1, wherein the shaft is substantially composed of carbon fiber.

10. The hub assembly of claim 9, wherein the shaft has a diameter greater than 15 mm.

11. The hub assembly of claim 1, wherein at least a portion of the ratchet is mounted on said cogset.

* * * * *

UNITED STATES PATENT AND TRADEMARK OFFICE
CERTIFICATE OF CORRECTION

PATENT NO.      : 8,197,371 B2  
APPLICATION NO. : 12/019495  
DATED           : June 12, 2012  
INVENTOR(S)     : Christopher P. D'Aluisio Page 1 of 1

It is certified that error appears in the above-identified patent and that said Letters Patent is hereby corrected as shown below:

In the Specifications:

In Column 5, Line 20, change "¼" to -- 1 ¼ --.

In Column 5, Line 23, change "¼" to -- 1 ¼ --.

In Column 6, Line 49, change "¼" to -- 1 ¼ --.

In Column 6, Line 54, change "¼" to -- 1 ¼ --.

In Column 7, Line 1, change "¼" to -- 1 ¼ --.

In Column 7, Line 6, change "¼" to -- 1 ¼ --.

In Column 7, Line 18, change "¼" to -- 1 ¼ --.

In Column 7, Line 22, change "¼" to -- 1 ¼ --.

In Column 7, Line 42, change "and or" to -- and/or --.

In Column 10, Line 10, change "and or" to -- and/or --.

Signed and Sealed this
Twenty-fifth Day of December, 2012

David J. Kappos
*Director of the United States Patent and Trademark Office*